United States Patent
Kondo et al.

(10) Patent No.: US 6,535,684 B1
(45) Date of Patent: Mar. 18, 2003

(54) STRUCTURE FOR RETAINING OPTICAL FIBER

(75) Inventors: Katsuaki Kondo, Hyogo (JP); Minoru Yoshida, Hyogo (JP); Yasuhide Sudo, Hyogo (JP); Tatsuhiro Kawamura, Hyogo (JP); Kazuo Imamura, Hyogo (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 09/600,737

(22) PCT Filed: Jan. 21, 1999

(86) PCT No.: PCT/JP99/00219

§ 371 (c)(1), (2), (4) Date: Jul. 21, 2000

(87) PCT Pub. No.: WO99/38041

PCT Pub. Date: Jul. 29, 1999

(30) Foreign Application Priority Data

Jan. 22, 1998 (JP) .............................. 10-010469
Feb. 3, 1998 (JP) .......................... 10-021853

(51) Int. Cl.[7] ................................................ G02B 6/00
(52) U.S. Cl. ..................................................... 385/137
(58) Field of Search ............................... 385/134, 136, 385/137

(56) References Cited

U.S. PATENT DOCUMENTS 5,892,877 A * 4/1999 Meyerhoefer ............... 385/136
6,061,492 A * 5/2000 Strause et al. .............. 385/135
6,215,582 B1 * 4/2001 Sudo et al. .................. 385/134

FOREIGN PATENT DOCUMENTS

| JP | U525401 | 4/1993 |
| JP | 08086920 | 2/1996 |
| JP | A886920 | 4/1996 |
| JP | A8194121 | 7/1996 |
| JP | 8194121 | 7/1996 |

* cited by examiner

*Primary Examiner*—Javaid Nasri
(74) *Attorney, Agent, or Firm*—Birch, Stewart, Kolasch & Birch, LLP

(57) ABSTRACT

A structure for retaining an optical fiber, capable of not only handling a long optical fiber as one piece without causing the optical fiber as a whole to get loose but also reducing an area occupied by the optical fiber and retaining the same stably without causing micro-bending thereof to occur, wherein the optical fiber (1) is arranged so as to form planarly staggered turning portions thereof without causing intersecting parts to occur, a plurality of similar planarly staggered turning portions of the optical fiber being laminated in the same position in the direction of the thickness thereof which is at right angles to a plane on which the optical fiber is arranged, the resultant optical fiber (1) being generally retained in a sheet-like state by a fixing material (2), such as a bonding agent and a film.

20 Claims, 17 Drawing Sheets

F I G. 3
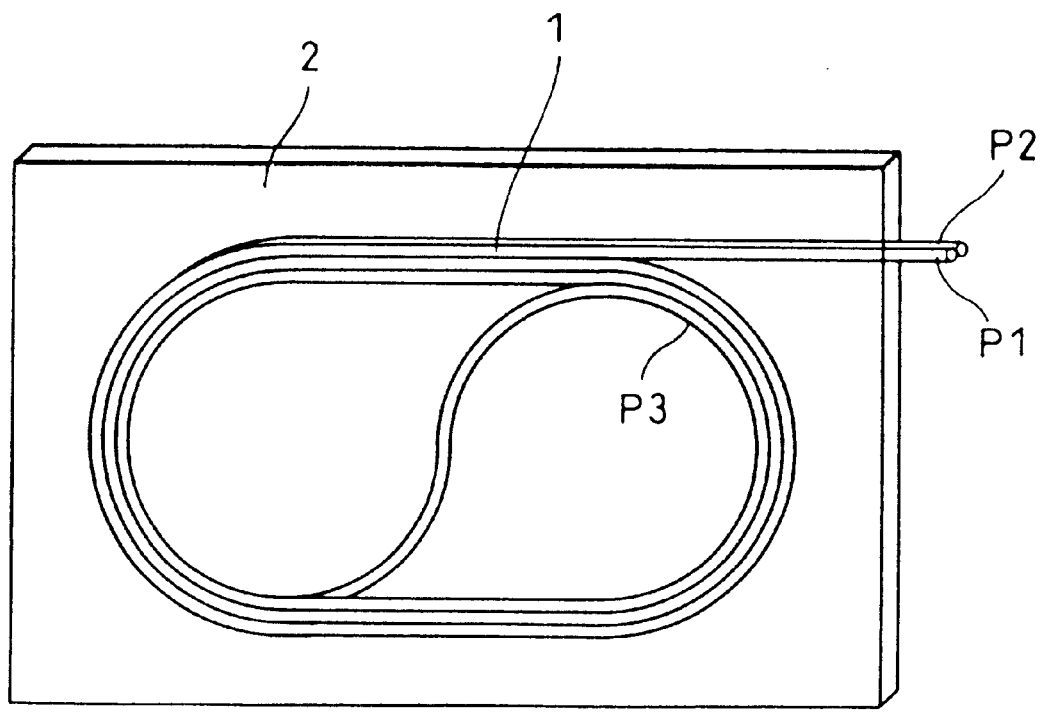

F I G. 1 3 (A)
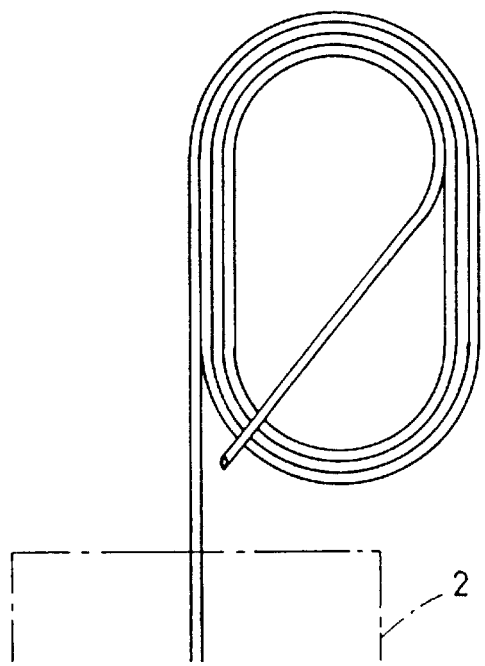
F I G. 1 3 (B)
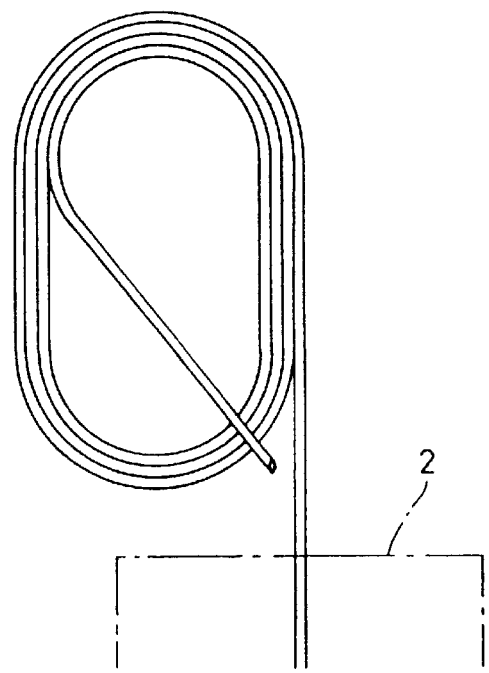

F I G. 1 9 (A)
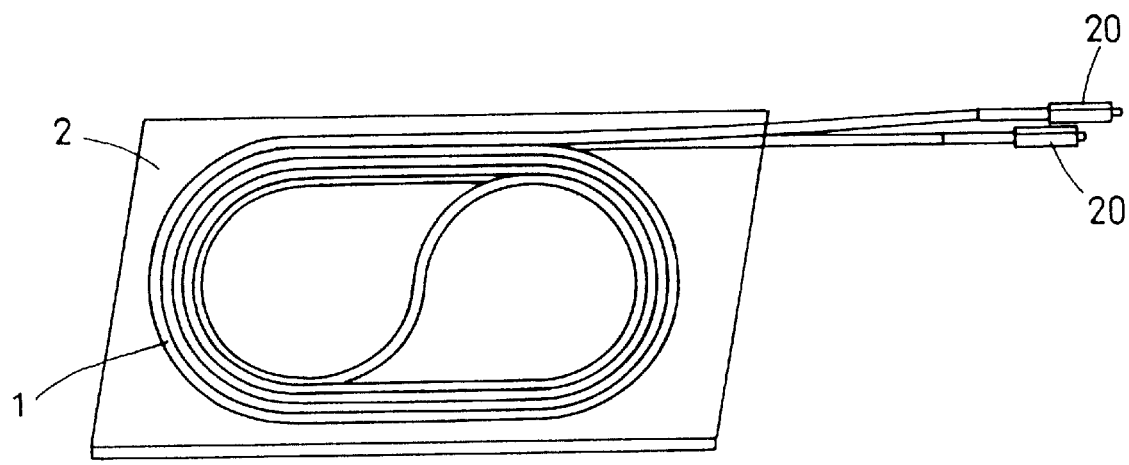
F I G. 1 9 (B)
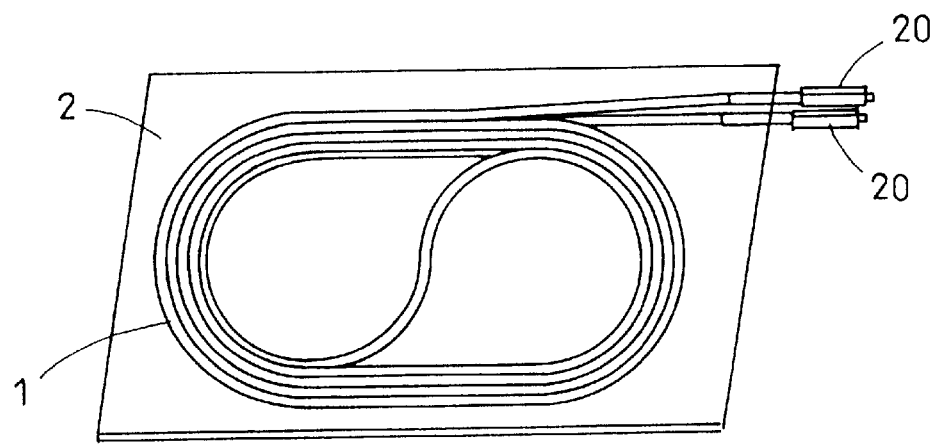

STRUCTURE FOR RETAINING OPTICAL FIBER

This application is the national phase under 35 U.S.C. §371 of PCT International Application No. PCT/JP99/00219 which has an International filing date of Jan. 21, 1999, which designated the United States of America.

FIELD OF THE INVENTION

The present invention relates to a structure for retaining a long optical fiber as one piece.

BACKGROUND OF THE INVENTION

Generally, a long optical fiber is employed as a constituent element in an apparatus such as an optical fiber amplifier and an optical fiber gyroscope.

The optical fiber amplifier comprises, for example, an amplification optical fiber having a core thereof doped with a rare earth element such as Er. The optical amplification factor of this amplification optical fiber is the product of the concentration of the doping element and the length of the optical fiber. That is, the optical amplification factor depends on a concentration-length product.

To obtain a high amplification factor, therefore, the concentration-length product may be set large. This, however, causes disadvantages such as inhibition of turning the optical fiber amorphous if the concentration of a doping element excessively increases. For that reason, while keeping the concentration of the element in a constant range, the length of the optical fiber is increased to some extent.

In this way, if an apparatus is assembled while using a long optical fiber, it is necessary to contain the optical fiber in the apparatus as one piece.

To this end, such processings as a processing for winding a long optical fiber around a reel or that for leading and attaching the optical fiber into the apparatus, have been hitherto carried out.

If such a reel is to be used, however, dead space occurs due to the central cavity of the reel and the thickness of a collar and packaging density is disadvantageously lowered. Further, since a high strength material is used for the reel, the reel cannot be given flexibility.

In addition, if the optical fiber is led into the apparatus, it is required to fix the optical fiber to hooks or the like at predetermined pitches' intervals while maintaining an appropriate radius of curvature so as not to increase bending loss or not to loosen the optical fiber, thereby disadvantageously taking time and labor to contain the optical fiber.

To avoid these disadvantages, there is proposed a structure in which an optical fiber is arranged in a state in which the turning positions of the optical fiber are staggered from one another planarly, and is retained by sealing it with a soft resin or the like into a sheet shape (see Japanese Patent Application No. 6-224908).

This structure has the following advantages. Since the optical fiber is formed into a sheet shape as a whole, it is thin, flexible due to use of the soft resin and is easy to package.

Nevertheless, if the optical fiber is arranged in a state in which the turning positions of the optical fiber are staggered from one another planarly, the occupied area of the optical fiber increases and the increase of the area is greater as the optical fiber becomes longer.

Furthermore, only by staggering the turning positions of the optical fiber planarly, the turning positions unavoidably intersect one another locally and large bending is generated at the intersecting parts, thereby making it impossible to sufficiently reduce loss.

It is, therefore, the first object of the present invention to allow not only integrally handling an optical fiber but also decreasing the occupied area of the optical fiber even if it is long, and stably retaining the optical fiber without causing it to get loose and without causing micro-bending or the like.

Further, if a long optical fiber integrated by a sheet-like fixing material stated above is incorporated in an apparatus, it is required to splice an externally-led optical fiber to the long optical fiber to establish connection between the apparatus with various equipment.

In that case, according to the conventional technique, the optical fiber is pulled out of the fixing material and a different type of an optical fiber is spliced to the pulled-out end portion. If so, splicing strength is weak in the splicing state, with the result that the end portion and the other optical fiber may be possibly disconnected from each other when external force, such as twist or bending, is applied to the spliced portion.

To avoid the disconnection, the conventional technique take measures such as reinforcing the spliced portion by using a splicing sleeve. If such a splicing sleeve is used, the reinforced portion becomes far thicker and far heavier than the outside diameter of the optical fiber and the reinforced portion tends to be moved. To fix it, it is necessary to take measures to separately provide a splicing sleeve holder on a substrate or the like, thereby disadvantageously taking time and labor for the assembly of the apparatus.

It is, therefore, the second object of the present invention to make a spliced portion compact and stable and allow retaining an optical fiber as well as the spliced portion integrally.

DISCLOSURE OF THE INVENTION

The first invention is an optical fiber retaining structure for fixedly retaining a long optical fiber as one piece, characterized in that the optical fiber is arranged to form planarly staggered turning portions without causing intersecting parts to occur, and to form a plurality of staggered turning portions laminated at a same position in a thickness direction of the optical fiber orthogonal to a plane on which the optical fiber is arranged; and the resultant optical fiber is retained integrally in a sheet-like state by a fixing material, the fixing material being a bonding agent or a film.

With this structure, it is possible to handle the long optical fiber as a piece while maintaining a thin shape thereof as a whole without causing the optical fiber to get loose, so that the optical fiber can be easily arranged in an apparatus. Besides, since the optical fiber does not have an intersecting part at the intermediate portion of the fiber, there is no fear of the occurrence of bending loss. Further, such a plural layer winding structure, in particular, can greatly reduce an occupied area of the optical fiber and, therefore, improve packaging density.

The second invention is based on the first invention and characterized in that an externally-led optical fiber is spliced with each end portion of the optical fiber, and that a spliced portion is contained within the fixing material. Due to this, the entire retaining structure including the spliced portion can be made compact, thereby facilitating connection with various equipment.

The third invention is an optical fiber retaining structure for fixedly retaining a long optical fiber as one piece, characterized in that the optical fiber is arranged to planarly form staggered turning portions without causing intersecting parts to occur without overlapping with one another at a same position, and the resultant optical fiber is retained in a sheet-like state integrally by a fixing material, the fixing material being a bonding agent or a film; and an externally-led optical fiber is spliced to each end portion of the optical fiber and a spliced portion is contained within the fixing material. Therefore, even with a one-layer winding structure, the entire retaining structure including the spliced portion can be made compact, thereby facilitating connection with various equipment.

The fourth invention is based on any one of the first to third inventions and characterized in that the optical fiber has an S-shaped innermost side serving as a winding start portion and sequentially wound in a track shape from the winding start portion toward a winding end portion. Therefore, the portion on which the optical fiber is led from the fixing material becomes linear, which linear shape is advantageous in connection with another optical fiber. Besides, with this structure, a twist does not occur and the long optical fiber can be contained in a compact manner in an apparatus.

The fifth invention is an optical fiber retaining structure characterized in that a plurality of the optical fiber retaining structure according to the first to fourth inventions are combined in an optical fiber continuous state and the combined retaining structures are superposed in a thickness direction of a fixing material to thereby form another optical fiber retaining structure; and turning directions of superposed, adjacent upper and lower retaining structures are set to face opposite to each other. Therefore, a twist does not occur to a portion on which a continuous optical fiber moves from one of the upper and lower retaining structures to the other, whereby the increase of loss and the like can be avoided.

The sixth invention is based on any one of the first to fifth inventions and characterized in that a fixing member such as a washer is integrally retained by the fixing material at a different position from a position of the optical fiber. It is, therefore, possible to obtain a retaining structure having an attachment portion for attaching the structure to various equipment in advance, facilitating attaching the structure to the equipment.

The seventh invention is based on any one of the second to sixth inventions and characterized in that the spliced portion is subjected to a re-coating processing. As a result, the spliced portion is covered with the fixing material after being subjected to a re-coating processing, thereby ensuring the protection of the spliced portion.

The eighth invention is based on any one of the first to seventh inventions and characterized in that a spliced position, at which the optical fibers are spliced with each other, of the spliced portion is fitted into a protection holder, the protection holder sealed by the fixing member. This can further ensure the protection of the spliced portion compared with the seventh invention.

The ninth invention is based on any one of the first to eighth inventions and characterized in that a perforated notch is formed in an optical fiber leading-side end portion of the fixing material. The tenth invention is based on any one of the first to eighth inventions and characterized in that a concave portion is formed on an optical fiber leading-side end portion of the fixing material in an optical fiber leading direction. Further, the eleventh invention is based on any one of the first to eighth inventions and characterized in that a notch is formed in a part of an outer peripheral portion of the fixing material to thereby provide a flexible piece at the fixing material; and an optical fiber leading-side end portion is positioned at the flexible piece. As can be seen, according to the ninth to eleventh inventions, the fixing material is easily bent in the thickness direction thereof, so that it is possible to prevent the bending or the like of the optical fiber.

The twelfth invention is based on any one of the first to eleventh inventions and characterized in that the fixing material is formed by connecting two films to each other with the optical fiber vertically put between the two films. This laminated structure facilitates fixedly sealing the optical fiber.

The thirteenth invention is based on the twelfth invention and characterized in that a bonding agent is coated on at least one of surfaces of the films, the surfaces facing each other. This can further facilitate operation for fixedly sealing the optical fiber to the fixing material.

The fourteenth invention is based on any one of the first to eleventh inventions and characterized in that the fixing material is made of a mold material for sealing the optical fiber. If the optical fiber is sealed by a mold material, the optical fiber can be retained more rigidly, making it difficult to exert the influence of external pressure on the structure.

The fifteenth invention is based on any one of the first to fourteenth inventions and characterized in that an input and output connector is provided at each end portion of the optical fiber. This facilitates connecting the optical fiber with the optical fiber of another equipment compared with a case where the optical fibers are spliced with each other.

The sixteenth invention is a light amplifier characterized in that the light amplifier has an optical fiber retaining structure according to any one of the first to fifteenth inventions; and the optical fiber consists of an amplification optical fiber having a core doped with an rare earth element. This can facilitate assembly of an apparatus and make the overall apparatus small in size.

BRIEF DESCRIPTION OF THE DRAWINGS

FIG. 3 is a perspective view showing a structure for two-layer-winding and retaining an optical fiber;

FIG. 13 is another explanatory view if the terminal end portion of the optical fiber is pulled out of the inner end side of the turning portion thereof;

FIGS. 19(A) and 19(B) are plan cross-sectional views showing an optical fiber retaining structure provided with input/output connectors.

DESCRIPTION OF THE PREFERRED EMBODIMENTS

The preferred embodiments of the present invention shown in the accompanying drawings will be described hereinafter.

Figure 1:
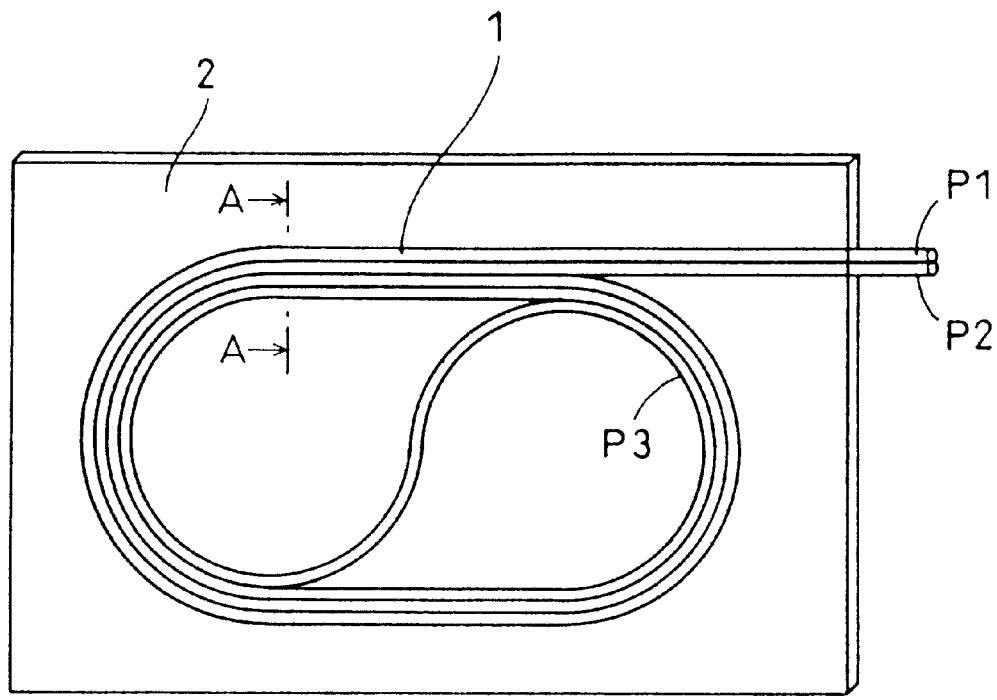
FIG. 1 is a perspective view showing a structure for one-layer-winding and retaining an optical fiber.

FIG. 1 is a perspective view showing an optical fiber retaining structure in one embodiment of the present invention.

In the optical fiber retaining structure in this embodiment, a long optical fiber 1 is retained integrally by a sheet-like fixing material 2 so as not to deform the turning shape of the optical fiber 1.

The optical fiber 1 is arranged to planarly stagger the turning portions thereof from one another so that they do not intersect one another. The innermost portion of the optical fiber 1 as a winding start portion is S-shaped and the optical fiber is sequentially wound, like tracks, from the winding start portion toward a winding end portion. The optical fiber is not stacked in the thickness direction of the fixing material 2 orthogonal to the plane on which the optical fiber 1 is arranged but is wound as only one layer (which will be referred to as "one-layer winding" hereinafter).

Figure 2:
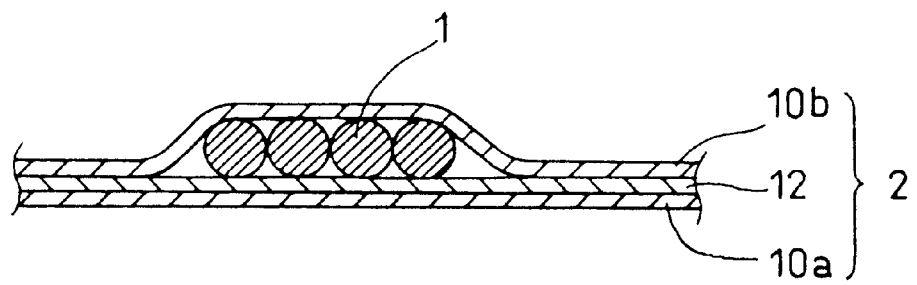
FIG. 2 is a cross-sectional view taken along line A—A of FIG. 1.

As shown in FIG. 2, the fixing material 2 is a laminate structure in which upper and lower films 10a and 10b for putting the optical fiber 1 therebetween are joined to each other. An bonding agent is applied on the lower film 10a facing the film 10a to thereby provide a bonding layer 12. It is also possible that both or either of the upper and lower films 10a and 10b is provided with the bonding layer 12.

For example, silicon resin may be used as a material for the films 10a and 10b, because it is advantageously stable for a long time without alteration. Urethane rubber, UV resin or epoxy resin may be used, as well. It is also possible to use polyester resin, polypropylene resin or polyethylene resin.

While the fixing material 2 of laminate structure is used in this embodiment, mold resin may be used to seal the optical fiber 1. Alternatively, a fixing material of a structure in which the fixing material 2 is formed into a bag shape in advance, an optical fiber 1 is inserted into the bag-shaped material 2 and the bag is then evacuated, may be used.

An optical fiber retaining structure-in an embodiment shown in FIG. 3 is such that the long optical fiber 1 is retained integrally by a sheet-like fixing material 2 so as not to loosen the turning shape of the optical fiber.

That is to say, the optical fiber 1 is arranged to planarly stagger turning portions thereof from one another so that they do not intersect one another. The innermost side as a winding start portion is S-shaped, and the optical fiber 1 is sequentially wound like tracks from the winding start portion toward a winding end portion. The constitution of the fixing material 2 is the same as that shown in FIG. 2.

The constitution shown in FIG. 3 differs from that shown in FIG. 2 in that the optical fiber 1 is wound as two layers, i.e., upper and lower layers at the same position in the thickness direction of the fixing material 2 orthogonal to the winding direction (which will be referred to as "two-layer winding" hereinafter).

In the embodiments shown in FIGS. 1 and 3, the optical fiber 1 is shown wound only a few times to facilitate understanding the invention. Actually, however, it is a long optical fiber that is dealt with and the optical fiber is wound far larger number of times than those shown in FIGS. 1 and 3. This is true for a case of three-layer winding the optical fiber to be described later.

Figure 4:
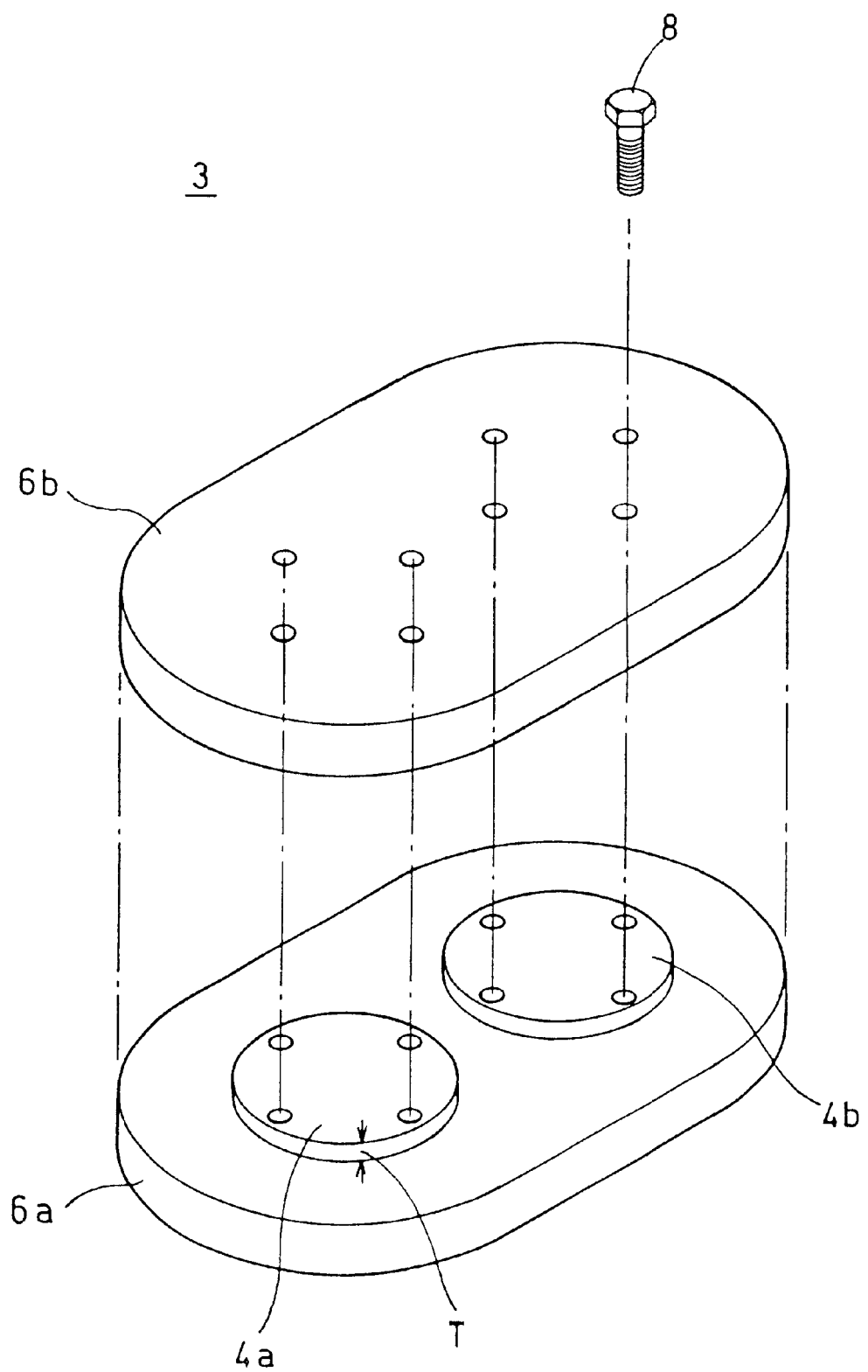
FIG. 4 is a perspective view of a manufacturing tool used to obtain an optical fiber retaining structure.

To manufacture the optical fiber retaining structures shown in FIGS. 1 and 3, a manufacturing tool as shown in, for example, FIG. 4 may be employed.

In this manufacturing tool 3, two winding cylindrical members 4a and 4b for winding the optical fiber 1 are arranged to be apart from each other by a predetermined distance and a pair of alignment side plate members 6a and 6b of ellipsoidal shape are provided while vertically putting the two winding cylindrical members 4a and 4b therebetween. One alignment side plate member 6a and the two winding cylindrical members 4a and 4b are formed integrally. The other alignment side plate member 6b is fixed to each of the winding cylindrical members 4a and 4b by bolts 8 or the like.

Each of the winding cylindrical members 4a and 4b is designed such that a thickness T put between the upper and lower alignment side plate members 6a and 6b is set according to the number of laminations of the optical fiber 1 and that a diameter is set so as not to adversely affect breaking life time after retaining the shape. For example, if the optical fiber 1 has a coating of an outside diameter of 250 μm, the diameter of each of the winding cylindrical members 4a and 4b is set at about 50 mm.

Next, description will be given to a manufacturing method for obtaining the optical fiber retaining structures shown in FIGS. 1 and 3.

To obtain the structure of retaining the one-layer-wound optical fiber shown in FIG. 1, a tool in which the thickness T of each of the winding cylindrical members 4a and 4b corresponds to the diameter of the optical fiber 1, is employed as the manufacturing tool shown in FIG. 4.

Figure 5:
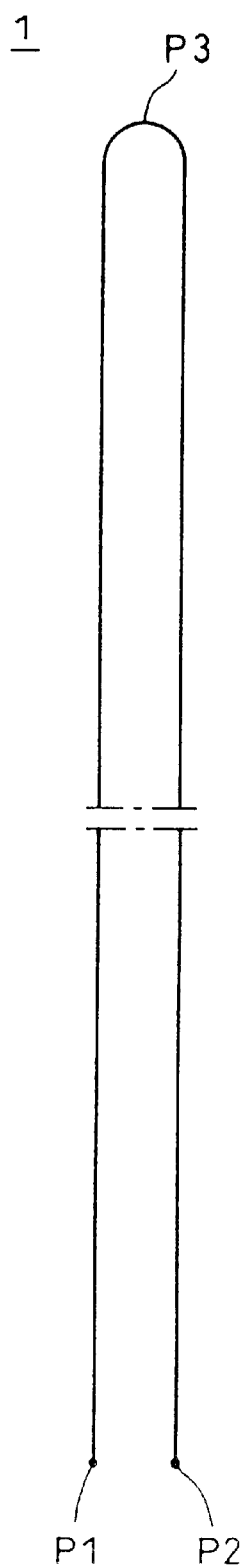
FIG. 5 is an explanatory view for a manufacturing method for obtaining the optical fiber retaining structures shown in FIGS. 1 and 3.
Figure 6A:
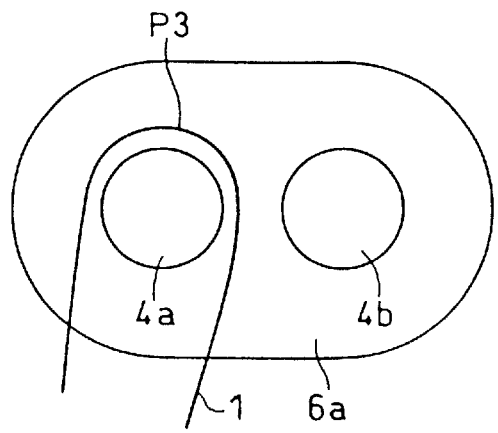
FIGS. 6(A–F) is an explanatory view for concrete procedures for one-layer-winding an optical fiber.

As shown in FIG. 5, the optical fiber 1 is uniformly two-folded with terminal end portions P1 and P2 thereof trued up. The folded portion P3 is suspended on one of the winding cylindrical members, e.g., member 4a of the manufacturing tool 3 as shown in FIG. 6(A).

Figure 6B:
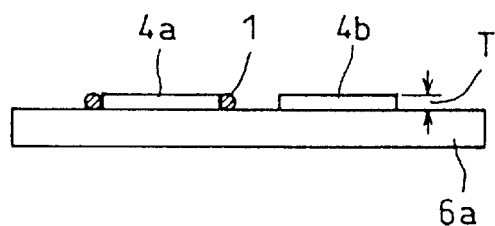

Next, as shown in FIG. 6(B), two optical fiber portions derived from folding are wound around the other winding cylindrical member 4b.

Figure 6C:
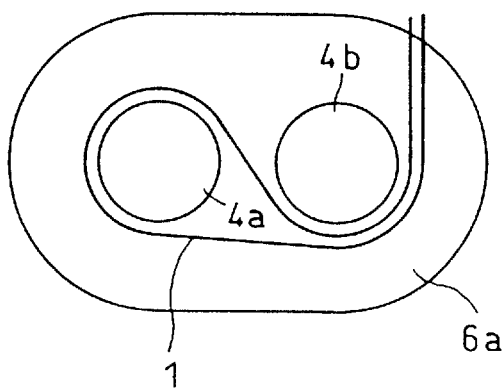
Figure 6D:
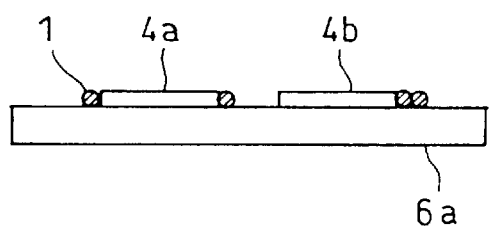
Figure 6E:
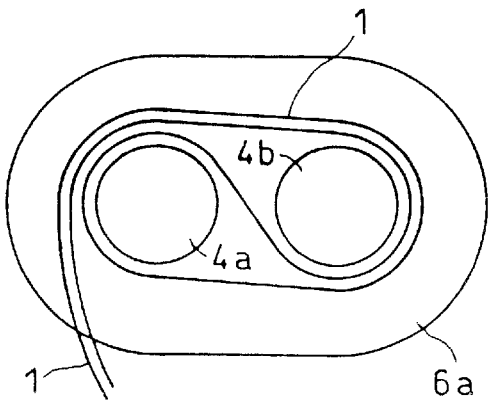
Figure 6F:
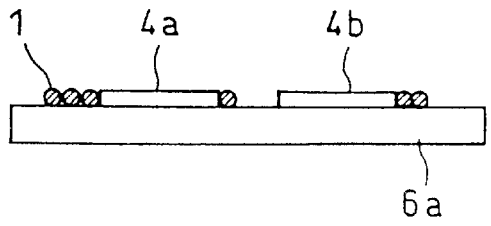

Thereafter, as shown in FIG. 6(C), the optical fiber is sequentially wound around the winding cylindrical members 4a and 4b.

As a result, the optical fiber 1 has a S-shaped winding start portion and the remaining portions thereof are sequentially wound into track shape. In that case, the thickness T of each of the winding cylindrical members 4a and 4b of the manufacturing tool 3 corresponds to the diameter of the optical fiber 1, so that the optical fiber 1 does not have a laminate structure in the thickness T direction and is wound in the diameter direction of the winding cylindrical members 4a and 4b.

When the winding of the optical fiber 1 is completed, a bonding agent or the like is injected between the alignment side plate members 6a and 6b and hardened to temporarily stop the members 6a and 6b. Thereafter, the bolts 8 are loosened and the manufacturing tool 3 is detached from the optical fiber 1. The two films 10a and 10b are joined to each other so as to vertically put the optical fiber therebetween and the films 10a, 10b and the optical fiber 1 are integrated with one another by the bonding layer 12. Consequently, the optical fiber 1 is sealed in a sheet shape by the fixing material 2.

Meanwhile, to obtain the structure of retaining the two-layer-wound optical fiber shown in FIG. 3, a tool in which the thickness T of each of the winding cylindrical members 4a and 4b is twice as large as the diameter of the optical fiber 1 (that is, the thickness corresponds to the thickness of a two-layer-wound optical fiber 1), is employed as the manufacturing tool 3 shown in FIG. 4.

Figure 7A:
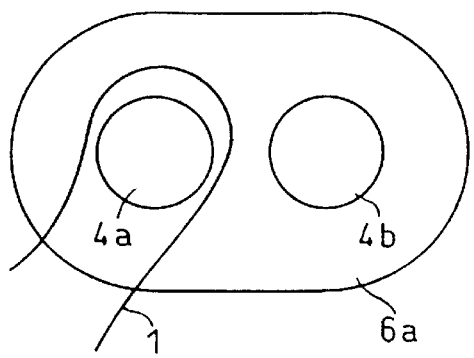
FIGS. 7(A–F) is an explanatory view for concrete procedures for two-layer-winding an optical fiber.

As shown in FIG. 5 as in the case of the above, the optical fiber 1 is arranged to be uniformly two-folded and the folded portion P3 is suspended on one of the winding cylindrical members, e.g., member 4a of the manufacturing tool 3 as shown in FIG. 7(A).

Figure 7B:
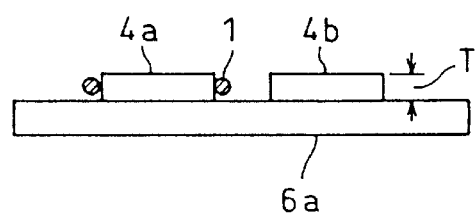

Next, as shown in FIG. 7(B), two optical fiber portions derived from folding are wound around the other winding cylindrical member 4b.

Figure 7C:
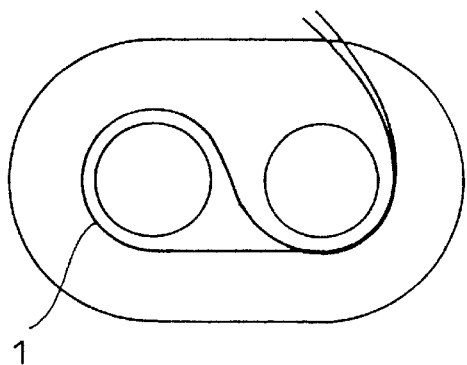
Figure 7D:
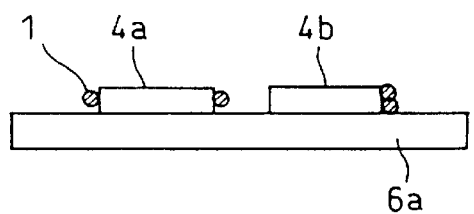
Figure 7E:
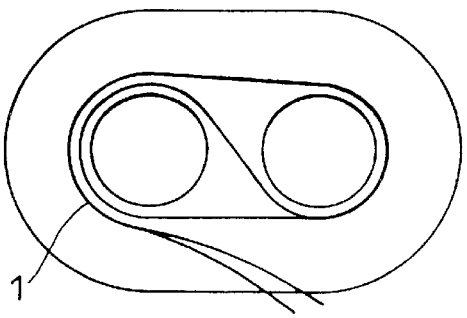
Figure 7F:
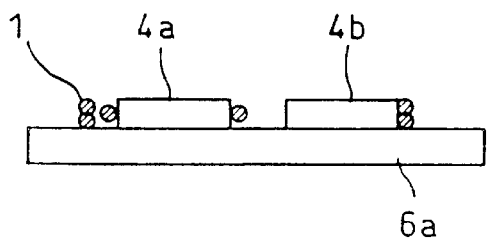

Thereafter, as shown in FIG. 7(C), the optical fiber is sequentially wound around the two winding cylindrical members 4a and 4b.

As a result, the optical fiber has an S-shaped winding start portion and the remaining portions thereof are sequentially wound in track shape. In that case, the thickness T of each of the winding cylindrical members 4a and 4b is set to be twice as large as the diameter of the optical fiber 1, so that the optical fiber 1 is wound twice in the thickness T direction of the winding cylindrical members 4a and 4b and wound a number of times in the diameter direction of the winding cylindrical members 4a and 4b.

When the winding of the optical fiber 1 is completed, a bonding agent or the like is injected between the alignment side plate members 6a and 6b and hardened to thereby temporarily stop the members 6a and 6b. Thereafter, the bolts 8 are loosened and the manufacturing tool 3 is detached from the optical fiber 1. The two films 10a and 10b are joined to each other so as to vertically put the optical fiber 1 therebetween and the films 10a, 10b and the optical fiber 1 are integrated with one another by the bonding layer 12. Consequently, the optical fiber 1 is sealed in a sheet shape by the fixing material 2.

As can be seen, with each of the optical fiber retaining structures in the embodiments shown in FIGS. 1 and 3, since the optical fiber 1 is fixed by the fixing material 2, the optical fiber 1 is not loosened and can be, therefore, dealt with integrally. As a result, the optical fiber 1 can be easily contained in an apparatus.

Moreover, since the optical fiber 1 is wound so that turning portions of the optical fiber 1 do not intersect one another, it is stably retained without causing micro-bending.

Furthermore, as shown in FIG. 3, if the optical fiber 1 is a two-layer-wound structure, the thickness of the fixing material 2 becomes slightly large compared with a case of the one-layer winding. However, the increase of the thickness is as small as the diameter of the optical fiber 1. Besides, the two-layer-wound optical fiber 1 can advantageously, greatly reduce its area, whereby more improvement of packaging density can be expected.

Additionally, as shown in FIGS. 1 and 3, if all portions but the inner peripheral portion of the optical fiber are arranged in track shape, a straight line portion is generated at the optical fiber 1 leading side, which portion is advantageous in the connection of the optical fiber 1 with another optical fiber. Besides, it is advantageous in retaining the write portion of a fiber grating.

Description has been given with reference to FIGS. 1 to 7, while taking a case of obtaining a structure for retaining a one-layer-wound or two-layer-wound optical fiber 1 as an example. It is also possible to obtain a structure of retaining a three or more layer-wound optical fiber.

Figure 8:
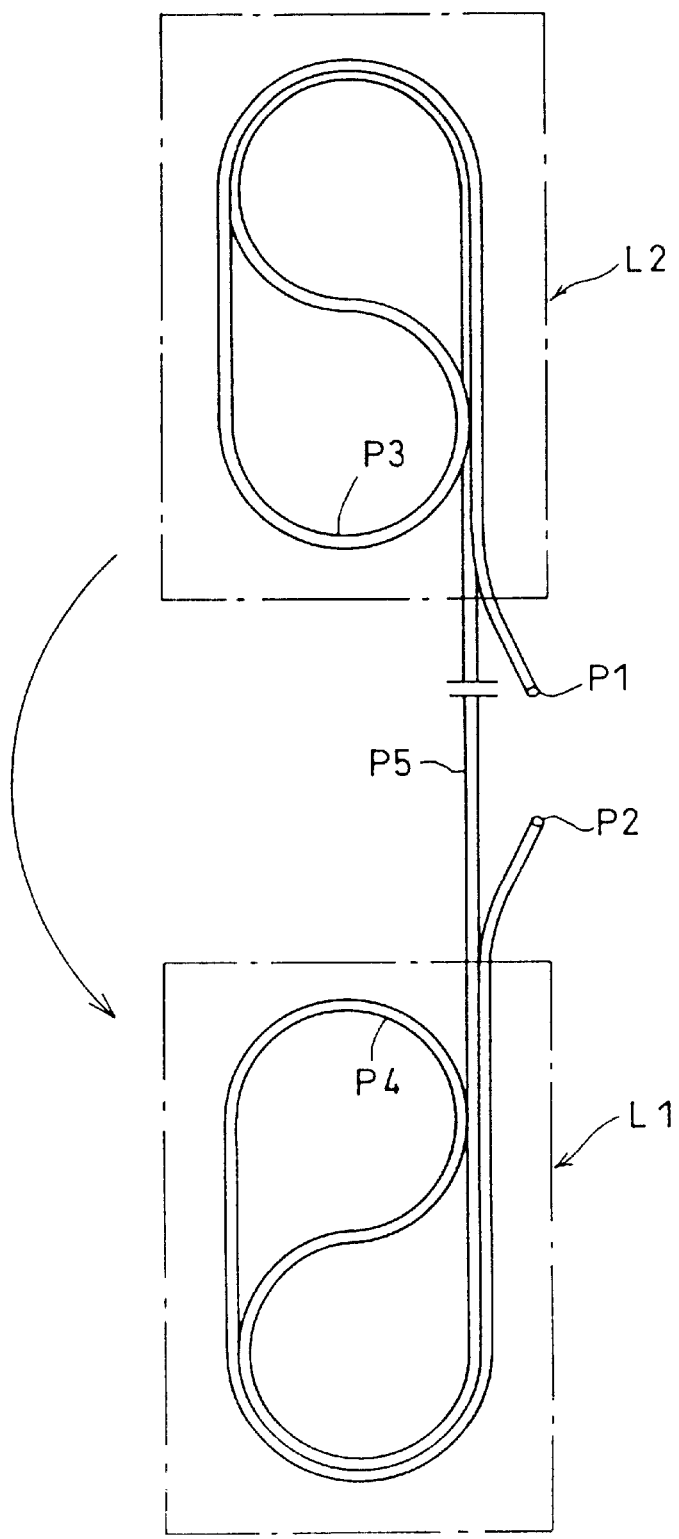
FIG. 8 is an explanatory view for steps in the course of obtaining a structure for three-layer-winding and retaining an optical fiber.

First, to obtain a three-layer-wound optical fiber, a two-layer-wound part L2 (same structure as that shown in FIG. 3) and a one-layer-wound part L1 (same structure as that shown in FIG. 1) are partially manufactured for a continuous optical fiber 1 as shown in, for example, FIG. 8 and the parts L1 and L2 are superposed on each other to provide a three-layer-wound retaining structure.

In that case, adjacent upper and lower parts L1 and L2 have opposite turning directions such that if the two-layer-wound part L2 is wound counterclockwise, for example, the one-layer-wound part L2 is wound clockwise so as to prevent the optical fiber 1 from being twisted at a position at which the parts L2 and L1 are connected to each other.

Figure 9:
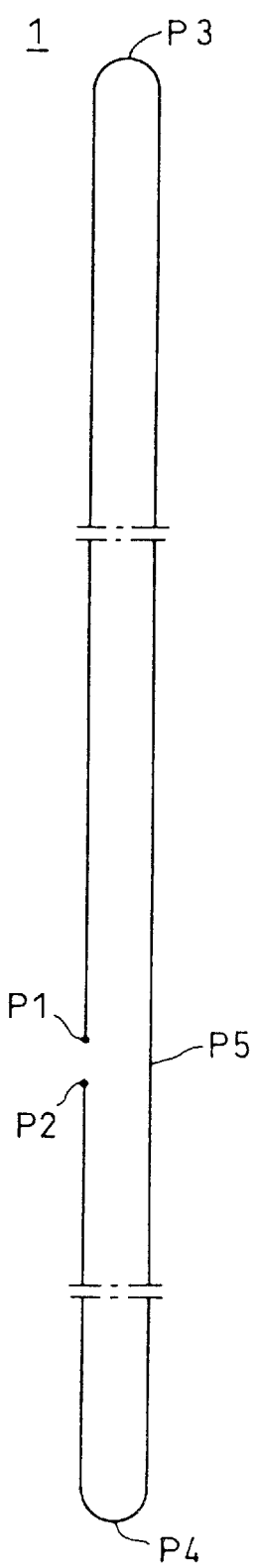
FIG. 9 is an explanatory view for a manufacturing method for obtaining the optical fiber retaining structure shown in FIG. 8.

Specifically, as shown in FIG. 9, the optical fiber 1 is arranged in a loop state. In that case, a length from one terminal end portion P1 of the optical fiber 1 to a portion indicated by a reference symbol P5 facing both terminal end portions P1 and P2 though one return portion P3 is set to occupy ⅔ of the entire length of the optical fiber 1 and a length from the other terminal end portion P2 to the portion P2 through the other return portion P4 is set to occupy ⅓ of the entire length thereof.

As for the portions P1 to P5 of FIG. 9, after the return portion P3 is suspended on a winding cylindrical member $4_a$ of the manufacturing tool 3, the optical fiber 1 is wound around the winding cylindrical members $4_a$ and $4_b$ counterclockwise in the same manner as that shown in FIG. 7 to thereby form a two-layer-wound part L2 (see FIG. 3).

Next, as for the portions P2 to P5 of FIG. 9, after the return portion P4 is suspended on the winding cylindrical member $4_a$ of the manufacturing tool 3, the optical fiber 1 is wound around the winding cylindrical members $4_a$ and $4_b$ clockwise in the same manner as shown in FIG. 6 to thereby form a one-layer-wound part L1 (see FIG. 1).

Then, an excessive-length portion (which is a portion near the portion P5 including P5) splicing the parts L1 and L2 is bent in a circular-arc manner and the parts L1 and L2 are superposed on each other and then the parts L1 and L2 are integrated with each other using the fixing member 2, thereby providing a three-layer-wound retaining structure.

Needless to say, it is also possible to take the opposite process as that described above. Namely, the one-layerwound part L1 may be formed first and then the two-layer-wound part L2 may be formed.

In the example shown in FIGS. 8 and 9, the one-layer-wound part L1 and the two-layer-wound part L2 are superposed on each other to provide the three-layer-wound retaining structure. It is also possible to form three one-layer-wound parts shown in FIG. 1 and to superpose them on one another to thereby provide a three-layer-wound retaining structure. In that case, too, the turning directions of the one-layer-wound parts are alternately changed so as to prevent the optical fiber 1 from being twisted at an excessive-length portion splicing the respective one-layer-wound parts.

Next, description will be given to a case of obtaining a four-layer-wound retaining structure.

Figure 10:
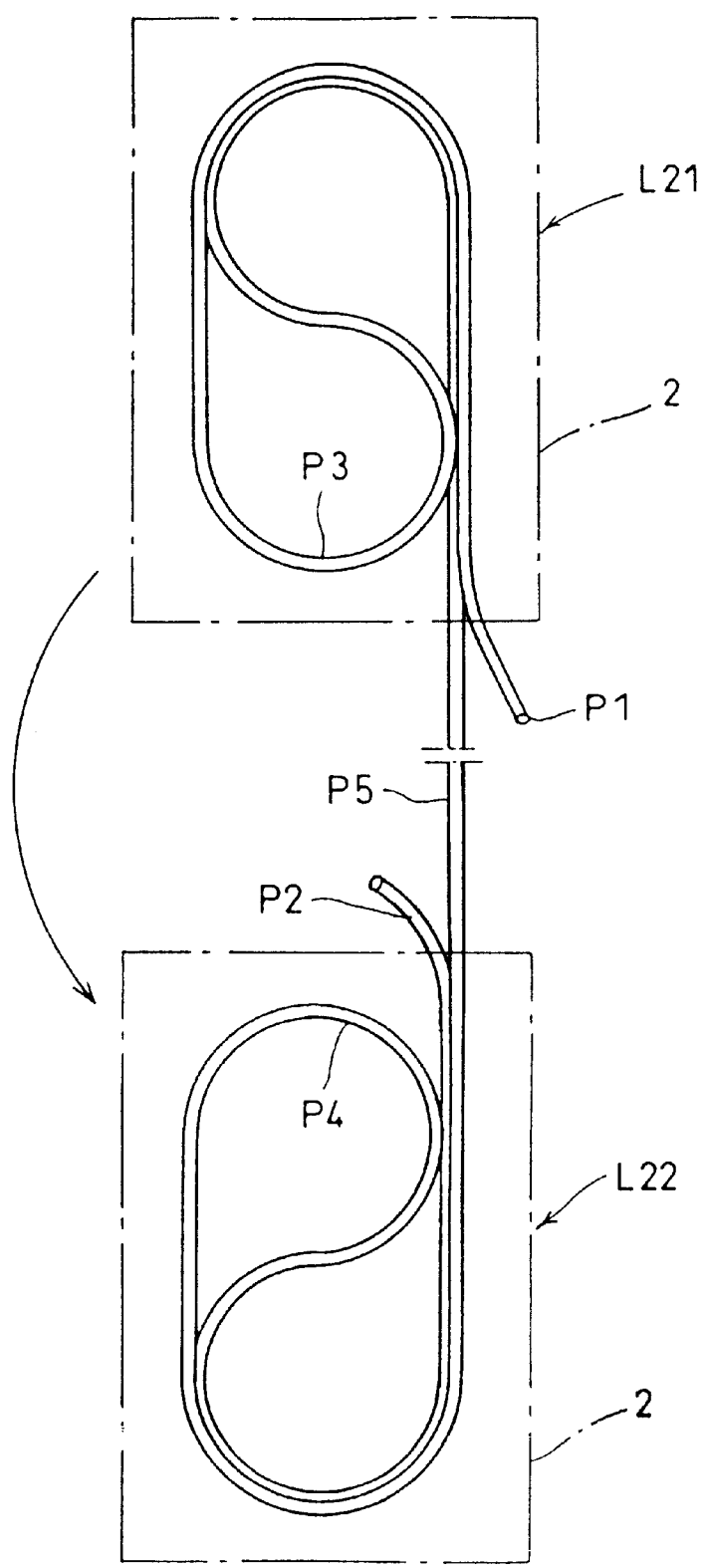
FIG. 10 is an explanatory view for steps in the course of obtaining a structure for four-layer-winding and retaining an optical fiber.

To obtain the four-layer-wound retaining structure, two two-layer wound parts L21 and L22 (same structure as that shown in FIG. 2) are partially formed for a continuous optical fiber 1 and then the parts L21 and L22 are superposed on each other as shown in FIG. 10, thereby providing a four-layer-wound retaining structure.

Figure 11:
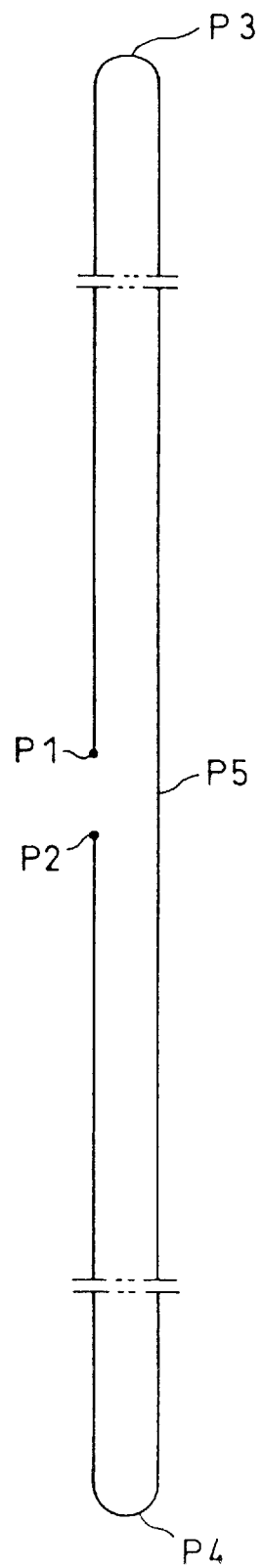
FIG. 11 is an explanatory view for a manufacturing method for obtaining the optical fiber retaining structure shown in FIG. 10.

Specifically, as shown in FIG. 11, the optical fiber 1 is arranged in a loop state. In that case, a length from one terminal end portion P1 of the optical fiber 1 to a portion indicated by reference symbol P5 facing both terminal end portions P1 and P2 through one return part P3 is set equal to a length from the other terminal end portion P2 to the portion indicated by reference symbol P5 through the other return portion P4, i.e., the length of the optical fiber 1 is set to be halved at the position of the portion P5.

Then, the parts P1-P3-P5 and P2-P4-P5 shown in FIG. 11 are wound about P3 and P4, respectively in the same manner as that shown in FIG. 7, thereby forming two-layer-wound parts L21 and L22.

In that case, too, if one two-layer-wound part L21 is wound clockwise, the other two-layer-wound part L22 is wound counterclockwise, so as not to twist the optical fiber at a position splicing the two-layer-wound parts L21 and L22.

After an excessive-length part (portion near P5 including P5) splicing the respective parts L21 and L22 is bent in circular-arc state to superpose the parts L21 and L22 on each other, the parts L21 and L22 are integrated with each other using a fixing member 2, thereby obtaining a four-layer-wound retaining structure.

While the above description concerns a four-layer-wound retaining structure, a five or more-layer-wound retaining structure can be manufactured in the same manner. Namely, if an even-number-layer winding is provided, two-layer-wound parts are laminated based on the manner of manufacturing the four-layer-wound structure. Also, an odd-number-layer winding can be provided by superposing one-layer-wound parts on the final layer of the even-number-layer winding.

Moreover, in the retaining structures shown in FIGS. 1 to 11, the terminal end portions P1 and P2 of the optical fiber 1 wound in a track state are led from the outer end side of the turning portion. Conversely, the terminal end portions P1 and P2 may be led from the inner end side of the turning portion.

Figure 12:
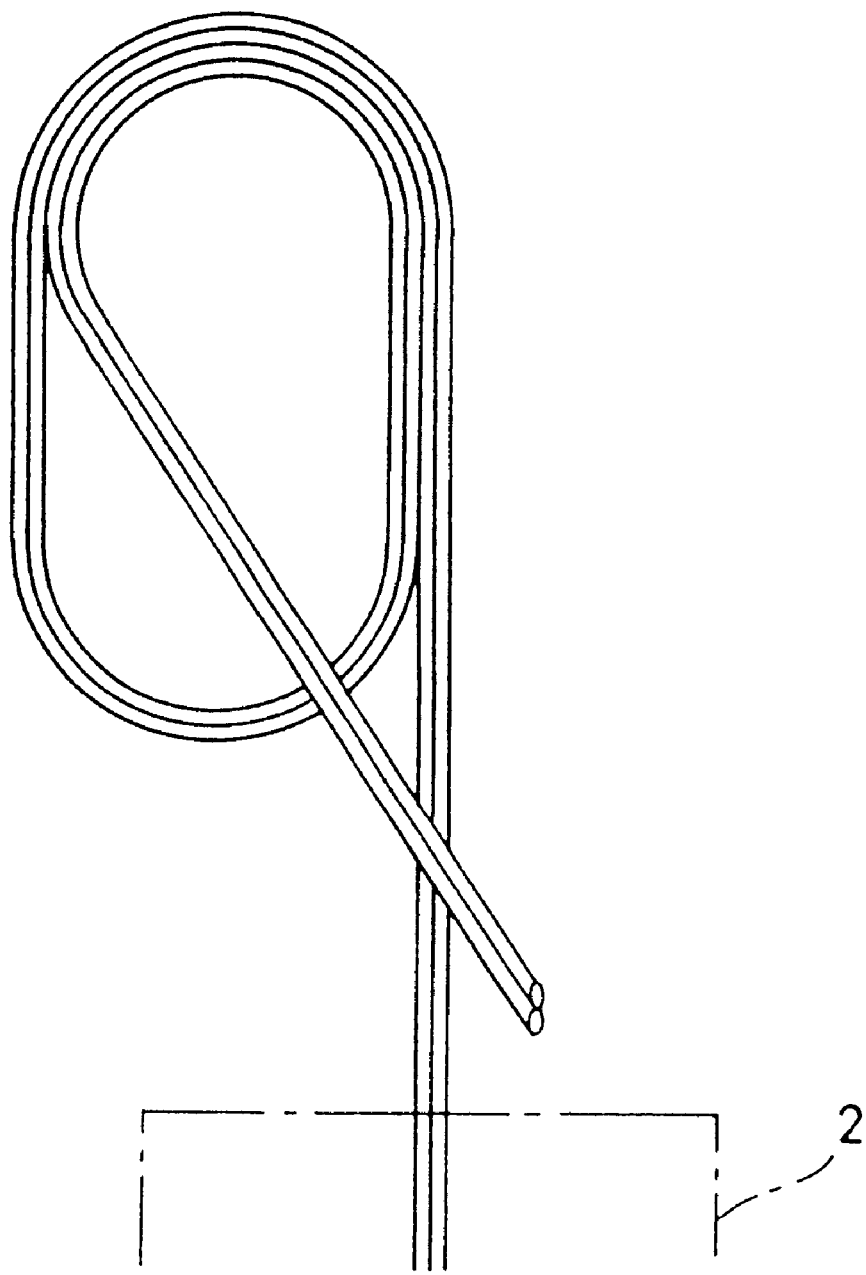
FIG. 12 is an explanatory view if terminal end portion of the optical fiber is pulled out of the inner end side of the turning portion thereof.

As shown in, for example, FIGS. 1 and 3, if the terminal end portions P1 and P2 are led externally while they are aligned, then a predetermined excessive length is secured for the externally-led terminal portions P1 and P2, the terminal portions P1 and P2 are wound in the same manner as that shown in FIG. 12 and fixed by the fixing member 2. The resultant structure is added to the retaining structure already formed.

Furthermore, as shown in FIGS. 8 and 10, if the terminal end portions P1 and P2 are led externally from the fixing member 2 separately, then a predetermined excessive length is secured for each of the portions P1 and P2, the portions P1 ad P2 are wound as shown in FIGS. 13(A) and 13(B) and fixed by the fixing member 2 and the resultant structure is added to the retaining structure already formed.

In this way, if the terminal end portions P1 and P2 of the optical fiber 1 are led from the inner end side of the turning portion, external connection can be advantageously established without causing large bending in the optical fiber. This is because the large degree of freedom of leading direction is obtained.

Meanwhile, in the above embodiment, only one optical fiber 1 is arranged circularly and fixedly retained by the sheet-shaped fixing material 2. If this retaining structure is incorporated into various apparatuses employing the optical fiber 1, it is necessary to splice and connect an externally-led optical fiber to the optical fiber for connection with various equipment.

Figure 14:
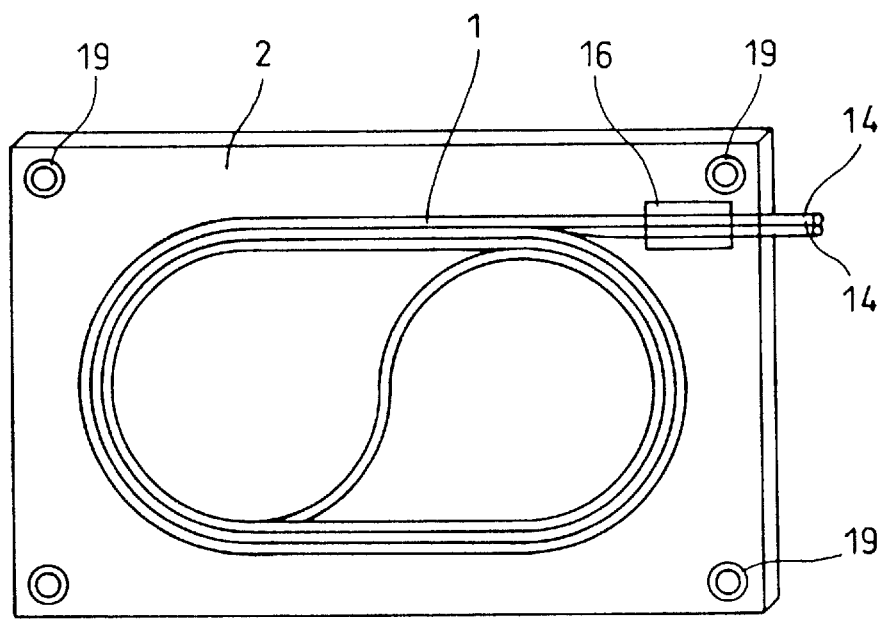
FIG. 14 is a perspective view of a structure for two-layer-winding and retaining the optical fiber shown in FIG. 3, showing that a spliced portion is provided in a fixing material in the structure.
Figure 15:
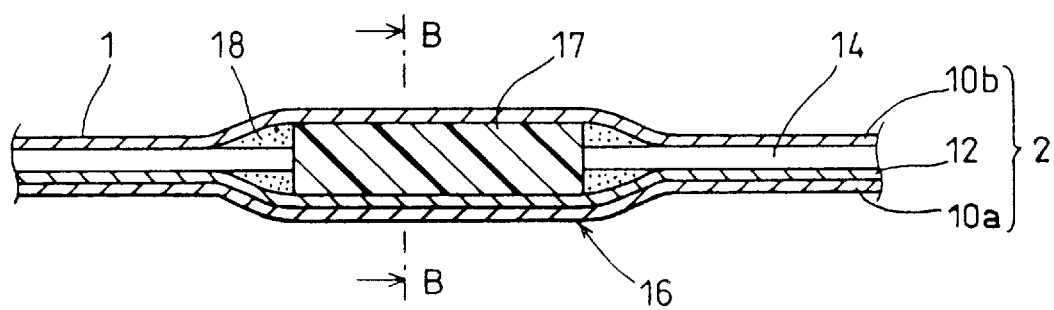
FIG. 15 is a plan cross-sectional view of the spliced portion in the structure of FIG. 14.
Figure 16A:
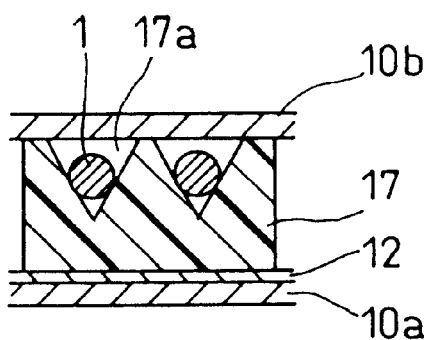
FIGS. 16(A–C) is a cross-sectional view taken along line B—B of FIG. 15.
Figure 16B:
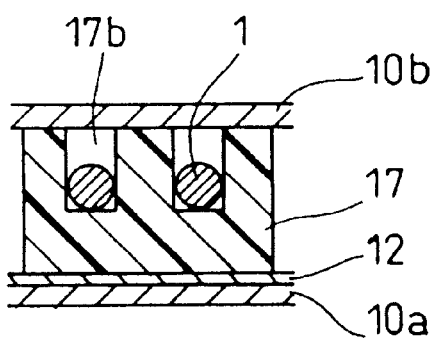

In that case, a structure shown in, for example, FIGS. 14 to 16 can be employed.

Namely, the optical fiber retaining structure shown in FIGS. 14 to 16 is basically the same as the two-layer-wound structure shown in FIG. 3 but is different therefrom in the following respects.

As shown in FIG. 14, as for the terminal end portions of the optical fiber 1, the superposed state in the thickness direction of the fixing material 2 is ended and these portions are arranged in parallel on the plane on which the fixing material 2 is arranged and external-led optical fibers 14 are spliced to the terminal end portions, respectively, thereby providing a spliced portion 16.

The spliced portion and the spliced portion-side end portions of the optical fiber portions 14 are simultaneously contained within the fixing material 2. Further, the other end sides of the externally-led optical fibers 14 are led externally of the fixing material 2.

As shown in FIG. 15, the position of the spliced portion 16 stated above on which the optical fibers 14 are spliced to each other, is fitted into a protection holder 17 and the holder 17 is sealed by the fixing material 2.

Figure 16C:
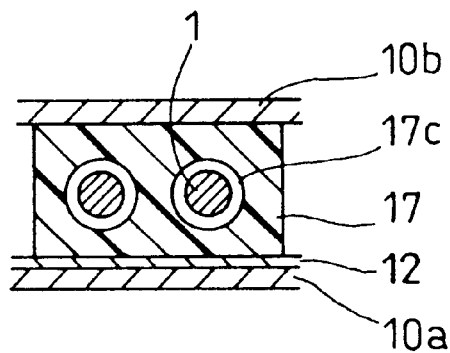

The holder 17 used therein is made of a material which does not damage the optical fibers 14 and which has small change in shape, for example, hard resin or glass. V-grooves 17a shown in FIG. 16(A), recessed grooves 17b shown in FIG. 16(B) or tubular through holes 17c shown in FIG. 16(C) are formed in part of the holder 17 and the positions at which the optical fibers 14 are spliced is inserted into the grooves 17a, 17b or through holes 17c. In that case, it is preferable that the spliced portions is re-coated with the same material as that of the coating layer of the optical fiber in advance.

Further, soft resin 18 is filled in spaces formed near the holder 17, thereby preventing unnecessary bending, twist or the like from occurring in the thickness direction of the fixing material 2 orthogonal to the axial direction of the optical fibers 1 and 14.

Figure 17:
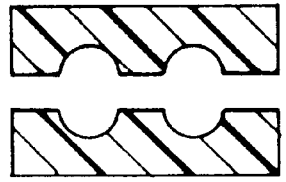
FIG. 17 is a cross-sectional view showing a modified example of a holder used in the structure of FIG. 14.

A filler such as bonding agent or jelly may be filled in the grooves 17a, 17b or through holes 17c of the holder 17a to retain the spliced portions. Alternatively, the holder 17 may be vertically or horizontally halved as shown in FIG. 17.

In the embodiment shown in FIG. 14, washers 19 serving as fixing parts for fixation to another equipment are temporarily held integrally with the fixing material 2 in the four corners of the fixing material 2. By integrally providing the washers 19 with the fixing material in advance, it is possible to easily attach this retaining structure to another equipment. As the fixing parts, not only the washers 19 but also plates made of, for example, hard resin may be used.

As can be seen from the above, with the optical fiber retaining structure shown in FIGS. 14 to 17, the spliced portion 16 as well as the long optical fiber 1 is temporarily retained by the fixing material 2 in a compact, stable manner, thereby facilitating handling the optical fiber if it is incorporated into an apparatus.

The spliced portion 16 is, in particular, temporarily fixed by the fixing material 2 and the portion 16 is small in size. Due to this, it is not required to separately attach a holder for fixing a splicing sleeve, to a substrate or the like as seen in the conventional structure.

Moreover, since the externally-led optical fibers are led from the fixing material 2, the structure can be easily connected to various equipment.

Figure 18A:
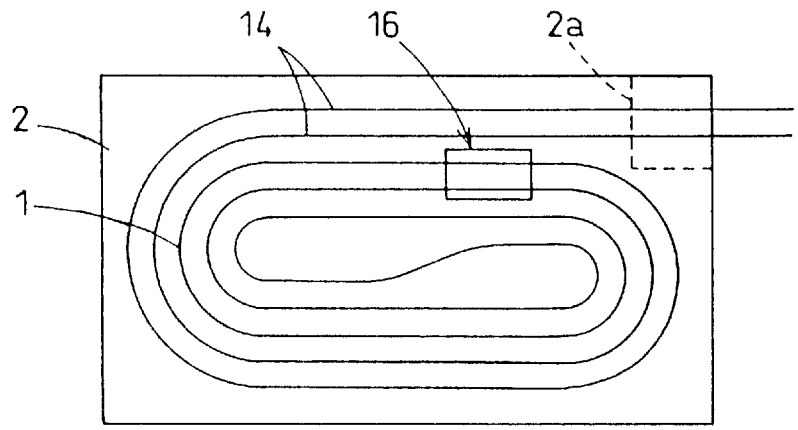
FIGS. 18(A), 18(B) and 18(C) are plan cross-sectional views of another embodiment in which a spliced portion is provided in a fixing material.
Figure 18B:
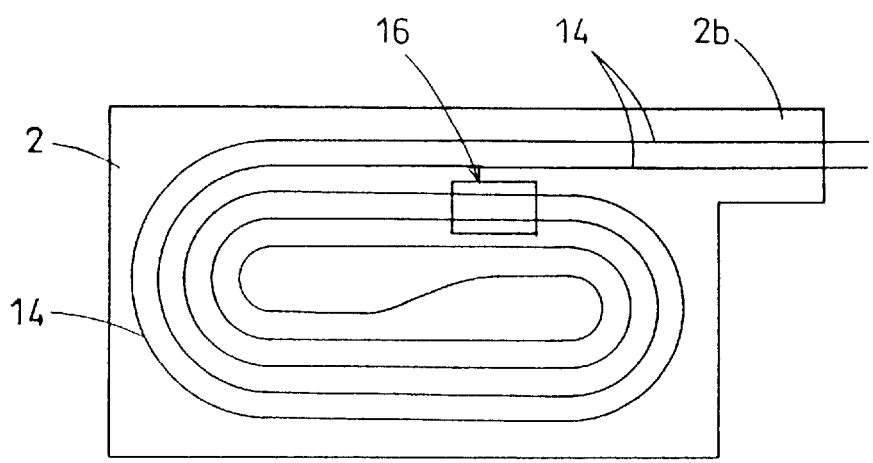
Figure 18C:
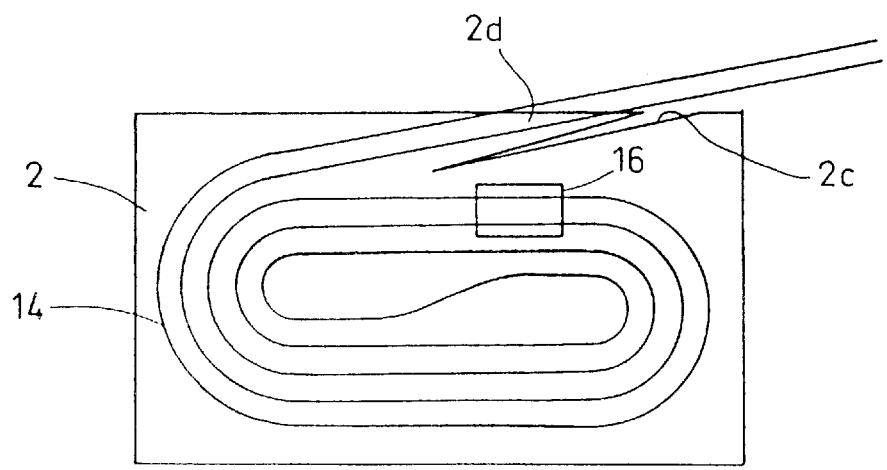

In the embodiment shown in FIG. 14, the spliced portion 16 is provided at a position of the external end portion of the optical fiber 1 wound in the fixing material 2. As shown in FIGS. 18(A) to 18(C), the externally-led optical fibers 14 may be arranged to be wound in a track state in the same manner as that of the optical fiber 1 to thereby position the spliced portion 16 at the inner side of the optical fibers 14. By doing so, it is possible to protect the spliced portion 16 from being applied with excessive external force.

Further, a perforated area 2a may be provided on the end portion of the fixing material 2 at the optical fiber 14 leading side as shown in FIG. 18(A), a protruding portion 2b may be provided in the direction in which the fixing material 2 leads the optical fibers 14 as shown in FIG. 18(B) or a notch 2c may be formed in one edge of the fixing material 2 to thereby provide a triangular flexible piece 2d as shown in FIG. 18(C).

With this structure, the end portion of the fixing material 2 at the optical fiber 14 leading side is made flexible and easily bent in the thickness direction thereof. Due to this, the degree of freedom of leading direction is increased if the optical fibers 14 are led out to connect the retaining structure with various equipment and bending or the like can be effectively prevented from occurring to the optical fibers 14.

The constitution for providing the fixing material 2 with the perforated notch 2a, protruding portion 2b or flexible piece 2d should not be limited to a case of providing the spliced portion 16 shown in FIGS. 14 to 18. The constitution can be applied to a structure for only allowing the fixing material 2 to retain the optical fiber 1 without providing the spliced portion 16 shown in FIGS. 1 to 13.

Further, in the constitution shown in FIGS. 14 to 18, the spliced portion 16 employs the holder 17. However, the spliced portion 16 can be re-coated with the same material as that of the coating layer of the optical fibers 1 and 14 and sealed in the fixing material 2 without providing the holder 17.

Moreover, as shown in FIG. 19, it is possible to provided an input/output connector 20 on each of the end portions of the optical fiber 1. In that case, as shown in FIG. 19(A), the connectors 20 are connected to the end portions of the optical fiber 1 led externally from the fixing material 2. Alternatively, as shown in FIG. 19(B), part of the connectors 20 may be contained in the fixing material 2. The input/output connectors 20 may be connected to the externally-led optical fibers 14 as shown in FIGS. 14 to 18.

Figure 20:
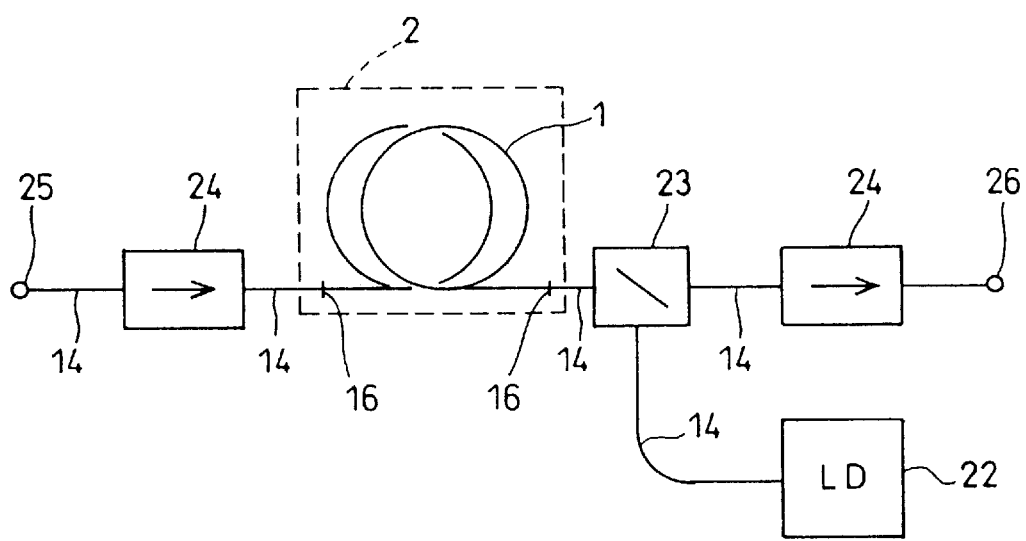
FIG. 20 is an overall block diagram of an optical fiber amplifier which is constituted by adopting the optical fiber retaining structure of the present invention.

FIG. 20 is an entire block diagram showing a case where an optical fiber amplifier is constituted by adopting the optical fiber retaining structure of the present invention.

The optical fiber amplifier shown in FIG. 20 includes an optical fiber having a core doped with a rare earth element (e.g., Er) as an amplification element so as to amplify signal light by a stimulated emission effect. An externally-led optical fiber 14 is connected to the optical fiber 1 through a spliced portion 16. An ordinary single-mode optical fiber made of, for example, quartz is used as this optical fiber 14.

The optical fibers 1 and 14 as well as the spliced portion 16 are retained by, for example, the structure shown in FIG. 14.

Reference symbol 22 denotes a laser diode for generating excitation light for pumping the amplification optical fiber 1, reference 23 denotes a light coupler for introducing the excitation light into the amplification optical fiber 1, reference symbol 24 denotes an isolator for allowing signal light to pass only in one direction and reference symbols 25 and 26 denote an incident end and an emission end, respectively.

A long optical fiber is employed as the amplification optical fiber 1 in the optical fiber amplifier constituted as stated above so as to ensure a required amplification factor. By adopting the optical fiber retaining structure of the present invention, it is possible to easily contain the optical fiber 1 as one piece in an apparatus even if an apparatus shown in FIG. 20 is assembled. Besides, since the optical fiber is planar as a whole, an occupied area thereof can be greatly reduced, whereby packaging density can be increased and the apparatus can be made small in size as a whole.

POTENTIAL INDUSTRIAL USE OF THE INVENTION

As stated so far, the present invention enables the following potential use.
(1) Since the optical fiber is sheet-shaped as a whole, it is thin, can be integrally handled without causing the optical fiber to get loose and can be easily arranged in an apparatus.
(2) Since the optical fiber is arranged to form turning portions without causing intersecting parts, it is stably retained without causing micro-bending or the like.
(3) If the optical fiber has a multiple-layer-wound structure, the thickness of the fixing material is slightly increased. The increase of the thickness is, however, only slight. Rather, the occupied area thereof can be greatly reduced even if the optical fiber is a long one, whereby packaging density can be increased.
(4) If the optical fiber is arranged to be wound in a track state, a straight line portion is generated on the optical fiber leading portion, which straight line portion is advantageous if another optical fiber is connected to the structure. Further, it is advantageous in retaining the write portion of a fiber grating.
(5) In case of obtaining a multiple-layer-wound retaining structure by superposing one-layer-wound and/or two-layer-wound optical fiber retaining structures, the optical fiber winding directions of upper and lower retaining structures adjacently superposed on each other are set opposite to each other. By doing so, twist does not occur to a portion moving from one of the upper and lower retaining structures to the other, whereby it is possible to avoid the increase of loss of the optical fiber and the occurrence of bending or the like to the optical fiber.

(6) When the optical fiber is fixed to another equipment, fixing parts such as washers are arranged integrally with the optical fiber. By doing so, a retaining structure having a fixing portion can be obtained in advance, thereby facilitating attaching the optical fiber to equipment or the like.

(7) If not only the long optical fiber but also the spliced portion are integrated with each other by the fixing material, the optical fiber can be retained in a compact, stable manner. Besides, since the externally-led optical fiber is led from the fixing material, the optical fiber can be handled more easily if it is assembled into an apparatus such as the easier connection of the structure to various equipment.

Additionally, it is not required to separately attach a holder for independently fixing a splicing sleeve, to a substrate or the like as seen in the conventional case.

Furthermore, if the spliced portion is sealed in the fixing material while being re-coated without using a holder for retaining the spliced portion, the resultant structure can be made simpler and thinner.

(8) If a perforated notch is provided on the optical fiber leading-side end portion of the sheet-like fixing material, if a protruding portion is provided in optical fiber leading direction or if a flexible piece is provided by forming a notch, then the fixing material is easily bent in the thickness direction thereof. Due to this, the degree of freedom of leading direction if the optical fiber is led out for connection to various equipment is increased and it is possible to prevent bending or the like from occurring to the optical fiber.

(9) If a sheet-shaped fixing material of a laminate structure is employed, the optical fiber can be easily sealed and integrated with the fixing material. In particular, if a bonding agent is coated on at least one side of a film, sealing operation can be carried out quite easily.

(10) If input/output connectors are provided on the respective end portions of the optical fiber in advance, the optical fiber can be connected to another equipment more easily than they are spliced to each other.

(11) If an optical fiber amplifier provided with the optical fiber retaining structure is constituted, an apparatus can be assembled easily and the apparatus can be made small in size as a whole.

What is claimed is:

1. An optical fiber system, comprising:
   an optical fiber arranged to be continuous and form planarly staggered turning portions without intersecting itself; and
   an optical fiber retaining structure for fixedly retaining said optical fiber as one piece, in a sheet-like state by a fixing material, said fixing material being a bonding agent or a film,
   wherein said optical fiber forms a plurality of staggered turning portions laminated at a fixed position in a thickness direction of the optical fiber orthogonal to a plane on which said optical fiber is arranged.

2. An optical fiber system according to claim 1, wherein an externally-led optical fiber is spliced to each end portion of said optical fiber forming a spliced portion, said spliced portion is contained within said fixing material.

3. An optical fiber retaining structure according to claim 2, wherein
   said spliced portion is subjected to a re-coating processing.

4. An optical fiber system according to claim 2, wherein said spliced portion is fitted into a protection holder and retained by said fixing material.

5. An optical fiber system according to claim 1, wherein said optical fiber has an S-shaped innermost side serving as a winding start portion and is sequentially wound in track shape from the winding start portion toward a winding end portion.

6. An optical fiber system according to claim 1, wherein a plurality of said optical fiber retaining structure are combined such that said optical fiber remains continuous and the combined optical fiber retaining structures are superposed onto one another in a thickness direction of said fixing material to thereby form a combined optical fiber retaining structure, and
   wherein a curvature of said optical fiber which is superposed onto itself is mirrored.

7. An optical fiber system according to claim 1, wherein a fixing member is integrally retained by said fixing material in a position that does not impede said optical fiber.

8. An optical fiber system according to claim 1, wherein a perforated area is formed in an optical fiber leading-side end portion of said fixing material.

9. An optical fiber system according to claim 1, wherein a protruding portion is formed on an optical fiber leading-side end portion of said fixing material in an optical fiber leading direction.

10. An optical fiber system according to claim 1, wherein a notch is formed in a part of an outer peripheral portion of said fixing material to thereby provide a flexible piece at said fixing material; and an optical fiber leading-side end portion is positioned at said flexible piece.

11. An optical fiber system according to claim 1, wherein said fixing material is formed by joining a first film and a second film to each other with the optical fiber disposed therein.

12. An optical fiber system according to claim 11, wherein a bonding agent is coated on at least one surface of said first or second film.

13. An optical fiber system according to claim 1, wherein said fixing material is made of a mold material for sealing the optical fiber therebetween.

14. An optical fiber system according to claim 1, wherein an input and output connector is provided at each end portion of said optical fiber.

15. An optical fiber system according to claim 1, further comprising a light amplifier operatively attached to said optical fiber retaining structure, wherein said optical fiber further comprises an amplification optical fiber having a core doped with a rare earth element.

16. An optical fiber system, comprising:
   an optical fiber arranged to be continuous and form planarly staggered turning portions without intersecting itself;
   an optical fiber retaining structure for fixedly retaining said optical fiber as one piece, in a sheet-like state by a fixing material, said fixing material being a bonding agent or a film, wherein said optical fiber forms staggered turning portions without overlapping one another at a fixed position; and
   an externally-led optical fiber is spliced to each end portion of said optical fiber forming a spliced portion, said spliced portion is contained within said fixing material.

17. A method of manufacturing an optical fiber retaining structure for retaining a continuous optical fiber as a whole, the steps comprising:

winding said optical fiber around a first winding cylinder such that a first portion of said optical fiber contacts a second portion of said optical fiber, forming a contacted portion;

winding said contacted portion around a second winding cylinder such that an inside portion of said optical fiber forms an S-shape without intersecting said first portion with said second portion, wherein said second winding cylinder is in a different position than said first winding cylinder; and retaining said optical fiber fixedly in a sheet-like state by a fixing material, wherein said contacted portion extrudes beyond said fixing material.

18. The method according to claim 17, wherein said fixing material is formed by joining a first film and a second film to each other with said optical fiber disposed therein.

19. The method according to claim 18, wherein a bonding agent is coated on a surface of said first or second film, said bonding agent contacting said optical fiber.

20. The method according to claim 17, the steps further comprising:

splicing an end portion of said contacted portion of said optical fiber to an externally-led optical fiber thereby forming a spliced portion, wherein said spliced portion may be contained within said fixing material.

\* \* \* \* \*